Patented Jan. 3, 1933

1,893,283

UNITED STATES PATENT OFFICE

EMMET F. HITCH AND MILES A. DAHLEN, OF WILMINGTON, DELAWARE, ASSIGNORS TO E. I. DU PONT DE NEMOURS & COMPANY, OF WILMINGTON, DELAWARE, A CORPORATION OF DELAWARE

CELLULOSE DERIVATIVE COMPOSITION

No Drawing.   Application filed November 28, 1931.   Serial No. 577,864.

This invention relates to cellulose derivative compositions containing an ortho- or para-alkoxy-diphenyl and, more particularly, to coating and plastic compositions comprising cellulose nitrate and an ortho- or para-alkoxy diphenyl.

Heretofore many substances have been used as plasticizers for cellulose derivatives to impart to the resulting compositions such properties as non-inflammability, flexibility, and the like.

An object of the present invention is to provide a cellulose derivative composition, particularly cellulose nitrate compositions, including a plasticizer having good solvent power for the cellulose derivative, exceedingly low volatility at room temperature, good stability, and miscibility or solubility in the usual solvents or solvent mixtures employed for dissolving cellulose derivatives. Another object is to provide cellulose derivative compositions which will give films that retain their flexibility substantially indefinitely.

The above objects are accomplished according to the present invention by employing in cellulose derivative compositions, as a plasticizer, an ortho- or para-alkoxy-diphenyl, or a mixture of the two, in conjunction with the usual solvents, diluents, fillers, resins, and/or pigments commonly used in cellulose derivative coating and plastic compositions.

It has been found that these ortho- and para-alkoxy-diphenyls as a class are suitable for use as plasticizers for cellulose derivative compositions, although the ortho- and para-alkoxy derivatives of diphenyl in which the alkoxy group contains from 1-7 carbon atoms, inclusive, are preferred, that is, alkoxy derivatives of diphenyl of the general graphic formula

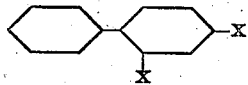

in which one X represents a hydrogen atom and the other X represents an alkoxy group containing from 1-7 carbon atoms. Still more specifically, the derivatives in which the alkoxy group contains from 1-4 carbon atoms have been found most suitable.

It has been found that the ortho-alkoxy diphenyls in general show materially lower melting points than the corresponding para-compounds and are, therefore, more readily used in greater quantity in cellulose derivative compositions than the corresponding para- derivatives. Furthermore, various individual compounds of the class show more favorable properties than others, for example, para-ethoxy-diphenyl shows a higher boiling point and lower melting point than the corresponding methoxy compound and is, therefore, somewhat more desirable for use as a plasticizer. It has also been found that a mixture of the ortho- and para-alkoxy diphenyls in many instances show properties equal to, or even superior to, either of the compounds alone. For example, a mixture of 10 parts of para-methoxy-diphenyl and 90 parts of ortho-methoxy-diphenyl exhibits a lower melting point than either of the components of the mixture, which makes the mixture more suitable for use in most instances than either component alone.

These alkoxy diphenyls may be conveniently prepared by converting ortho- or para-hydroxy diphenyl, available in large quantities as by-products in the manufacture of phenol, to the desired ether by the application of methods commonly used in converting phenol, cresol, and similar compounds, to their analogous derivatives. The following examples are given to show methods of preparing the ortho- and para-alkoxy diphenyls, although this invention is not primarily concerned with the preparation of these compounds.

*Example 1.*—Ortho-hydroxy-diphenyl is dissolved in water by the addition of a molar equivalent of sodium hydroxide, and this solution treated with a molar equivalent of dimethyl sulphate at a temperature of 60–100° C. Ortho-methoxy-diphenyl is deposited as an oil, and is separated, washed with strong alkali to remove unchanged hydroxy compound, dried and purified by distillation, preferably under diminished pressure. The resulting ortho-methoxy-diphenyl is a colorless solid melting at 29° C. and boiling at about 275° C. at atmospheric pressure.

*Example 2.*—Para-ethoxy-diphenyl may be aklylating agent and the substitution of ortho-methoxy-diphenyl as disclosed in Example 1 by the use of diethyl sulphate as the alkylating agent and the substitution of para-hydroxy-diphenyl for the ortho- compound. Para-ethoxy-diphenyl is also a colorless solid melting at about 78° C.

*Example 3.*—Ortho-hydroxy-diphenyl is dissolved in normal butyl alcohol and a molar equivalent of metallic sodium added. The resulting solution is then boiled under reflux for several hours with a molar equivalent of normal butyl chloride. The solution is filtered from deposited sodium chloride, washed with aqueous sodium hydroxide to remove unalkylated hydroxy compound, dried and then subjected to fractional distillation, preferably under reduced pressure. The ortho-butoxy-diphenyl thus prepared is a colorless liquid boiling at about 145° C. under 10 mm. pressure.

Among the most suitable compounds of the general class of ortho- and para-alkoxy-diphenyls for use as plasticizers for cellulose derivatives are the following:—

2-methoxy-diphenyl
2-ethoxy-diphenyl
2-N-propoxy-diphenyl
2-Iso-butoxy-diphenyl
2-N-butoxy-diphenyl
2-N-hexoxy-diphenyl
4-methoxy-diphenyl
4-ethoxy-diphenyl
4-Iso-propoxy-diphenyl
4-N-butoxy-diphenyl
4-Iso-heptoxy-diphenyl Particularly suitable mixtures of ortho- and para-alkoxy-diphenyls are the following:—

2-methoxy-diphenyl and 4-methoxy-diphenyl
2-ethoxy-diphenyl and 4-ethoxy-diphenyl
2-N-butoxy-diphenyl and 4-N-butoxy-diphenyl These alkoxy-diphenyls may be used as plasticizers for cellulose esters or cellulose ethers. They are particularly suitable for use with cellulose nitrate, inasmuch as they have excellent solvent power for that particular cellulose ester, but they may also be used with cellulose acetate, despite the fact that their solvent power for the acetate is considerably less than their solvent power for the nitrate. They also possess excellent solvent power for the cellulose ethers, such as ethyl cellulose and benzyl cellulose.

In preparing cellulose derivative compositions using these compounds as plasticizers, the methods commonly used in the art are suitable. The well known solvents and diluents for cellulose derivatives, such as ethyl acetate, butyl acetate, methanol, ethyl alcohol, ethylene glycol, toluene, acetone, and the like, may be employed as the alkoxy diphenyls are either soluble or miscible in these diluents. Likewise the other common ingredients employed in cellulose derivative compositions for special purposes may be added, such as other plasticizers, resins both natural and artificial, gums, pigments, fillers, etc. As will be understood by those skilled in the art, the proportion of plasticizer to cellulose derivative may be varied widely, as well as the various other ingredients in the composition.

Compositions prepared according to the present invention are suitable for use in the preparation of artificial leather, celluloid, lacquers, photographic film, and various plastics, as well as for all uses to which cellulose derivative compositions of this type are normally put. The resulting products are stable and retain their flexibility, which may be regulated, to a large degree, by the amount of plasticizer added, practically indefinitely. These compositions do not show any tendency to discolor due to decomposition of the alkoxy-diphenyls which are remarkably stable in combination with cellulose derivatives. In the case of plastic products, stabilizers, such as urea, may be employed, as well as the other ingredients herein mentioned.

As many apparently widely different embodiments of this invention may be made, without departing from the spirit and scope thereof, it is to be understood that the invention is not limited to the specific embodiments thereof except as defined in the appended claims.

We claim:

1. A composition comprising a cellulose derivative and, as a plasticizer therefor, a compound from the group consisting of the ortho- and para-alkoxy derivatives of diphenyl.

2. A composition comprising a cellulose derivative and, as a plasticizer therefor, a compound from the group consisting of the ortho- and para-alkoxy derivatives of diphenyl in which the alkoxy group contains from 1–7 carbon atoms, inclusive.

3. A composition comprising a cellulose derivative and, as a plasticizer therefor, a compound from the group consisting of the ortho- and para-alkoxy derivatives of diphenyl in which the alkoxy group contains from 1–4 carbon atoms, inclusive.

4. A composition comprising a cellulose derivative and, as a plasticizer therefor, an alkoxy derivative of diphenyl of the formula

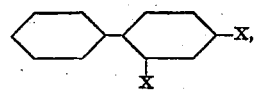

in which one X represents a hydrogen atom and the other X an alkoxy group containing 1–7 carbon atoms, inclusive.

5. A composition comprising a cellulose derivative and, as a plasticizer therefor, an alkoxy derivative of diphenyl of the formula

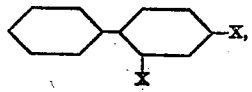

in which one X represents a hydrogen atom and the other X an alkoxy group containing 1–4 carbon atoms, inclusive.

6. A composition comprising a cellulose derivative and, as a plasticizer therefor, a mixture comprising an ortho-alkoxy derivative of diphenyl and a para-alkoxy derivative of diphenyl.

7. A composition comprising a cellulose derivative and, as a plasticizer therefor, a mixture comprising an ortho-alkoxy derivative of diphenyl and a para-alkoxy derivative of diphenyl, in which derivatives the alkoxy group contains 1–4 carbon atoms, inclusive.

8. A composition comprising cellulose nitrate and, as a plasticizer therefor, a compound from the group consisting of the ortho- and para-alkoxy derivatives of diphenyl.

9. A composition comprising cellulose nitrate and, as a plasticizer therefor, a compound from the group consisting of the ortho- and para-alkoxy derivatives of diphenyl in which the alkoxy group contains from 1–7 carbon atoms, inclusive.

10. A composition comprising cellulose nitrate and, as a plasticizer therefor, a compound from the group consisting of the ortho- and para-alkoxy derivatives of diphenyl in which the alkoxy group contains from 1–4 carbon atoms, inclusive.

11. A composition comprising cellulose nitrate and, as a plasticizer therefor, an alkoxy derivative of diphenyl of the formula

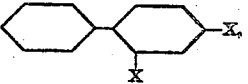

in which one X represents a hydrogen atom and the other X an alkoxy group containing 1–7 carbon atoms, inclusive.

12. A composition comprising cellulose nitrate and, as a plasticizer therefor, an alkoxy derivative of diphenyl of the formula

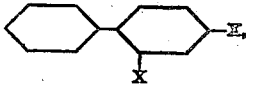

in which one X represents a hydrogen atom and the other X an alkoxy group containing 1–4 carbon atoms, inclusive.

13. A composition comprising cellulose nitrate and, as a plasticizer therefor, a mixture comprising an ortho-alkoxy derivative of diphenyl and a para-alkoxy derivative of diphenyl.

14. A composition comprising cellulose nitrate and, as a plasticizer therefor, a mixture comprising an ortho-alkoxy derivative of diphenyl and a para-alkoxy derivative of diphenyl, in which derivatives the alkoxy group contains 1–4 carbon atoms, inclusive.

In testimony whereof we affix our signatures.

EMMET F. HITCH.
MILES A. DAHLEN.

CERTIFICATE OF CORRECTION.

Patent No. 1,893,283.  January 3, 1933.

EMMET F. HITCH, ET AL.

It is hereby certified that error appears in the printed specification of the above numbered patent requiring correction as follows: Page 2, line 4, strike out the words "aklylating agent and the substitution", and insert instead "prepared similarly to the preparation"; and that the said Letters Patent should be read with this correction therein that the same may conform to the record of the case in the Patent Office.

Signed and sealed this 28th day of February, A. D. 1933.

(Seal)

M. J. Moore,
Acting Commissioner of Patents.